W. & C. T. HERBERT.
Corn and Potato Coverer.
No. 200,295. Patented Feb. 12, 1878.
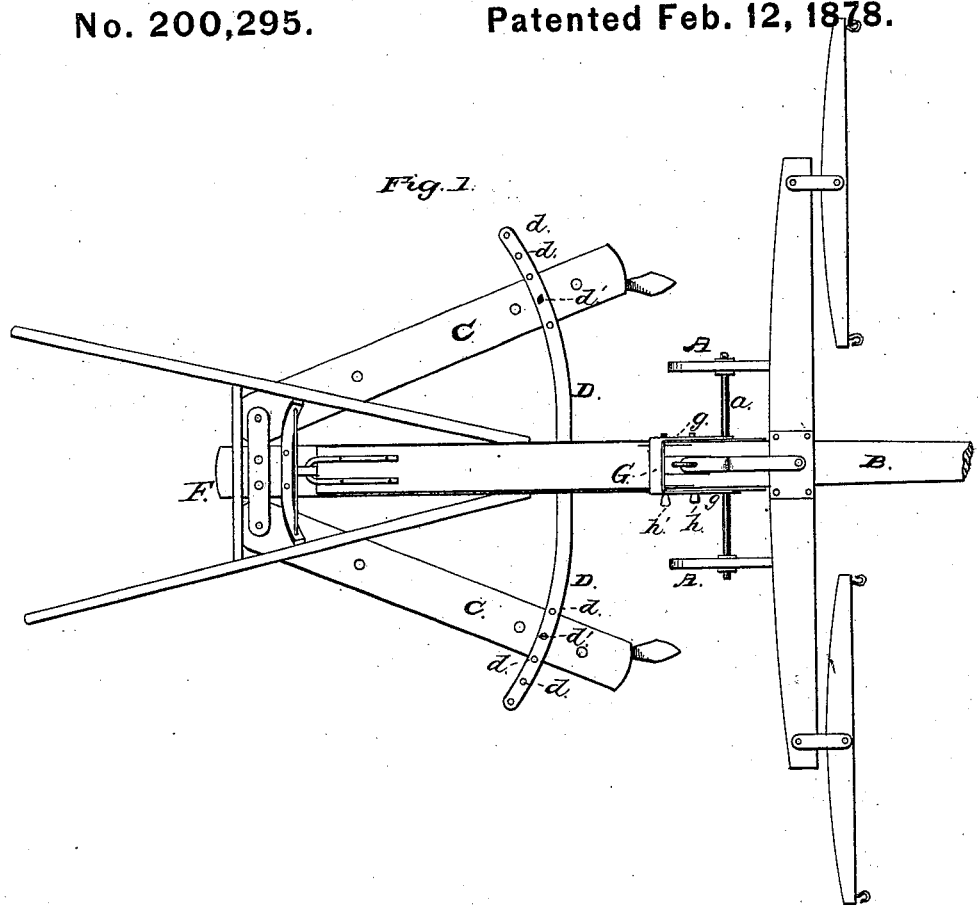
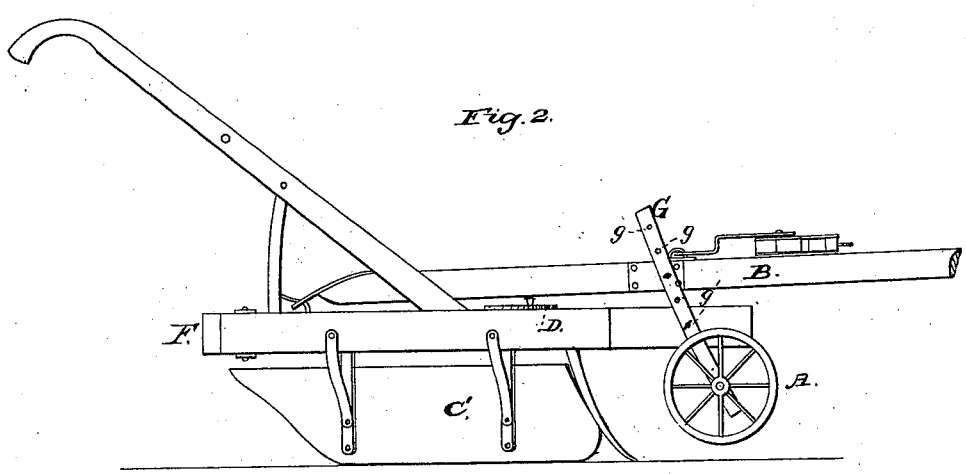

UNITED STATES PATENT OFFICE.

WILLIAM HERBERT AND CORNELIOUS T. HERBERT, OF IRVING PARK, ILL.

IMPROVEMENT IN CORN AND POTATO COVERERS.

Specification forming part of Letters Patent No. 200,295, dated February 12, 1878; application filed June 15, 1877.

*To all whom it may concern:*

Be it known that we, WILLIAM HERBERT and CORNELIOUS T. HERBERT, of Irving Park, Cook county, and State of Illinois, have invented a new and useful Improvement in Corn and Potato Coverers, of which the following is a specification:

Our invention relates to improved means of regulating the depth of covering by corn and potato coverers.

In the accompanying drawing, Figure 1 is a plan view of a corn and potato coverer constructed with our improvement. Fig. 2 is a side elevation of the same.

The letter F designates a center beam, and C C two wing beams, hinged to the rear end thereof, and extending forward. Under and rigidly attached to these wing-beams are the covering-wings C', arrranged to scrape the ground. The extent of divergence of the wing-beams and covering-wings from the center beam is governed by curved bars D, projecting from either side of the center beam F over the tops of the wing-beams, and each provided with a series of holes, $d$, through either of which may pass pins $d'$, which extend into sockets in said wing-beams.

A A designate a pair of wheels, provided with an axle, $a$, upward from which extends a double or loop standard, G, the side bars $g$ of which are provided with series of holes $g'$, arranged in each bar, opposite those in the other. Through this loop-bar extends the front end of the center beam F, which is secured by a pin, $h$, which passes through it and through holes in the loop-standard G, into either pair of which holes said pin may be placed, in order to extend the wheels more or less below the said center beam. Through that part of the loop-standard G which extends above the center beam passes the pole B, the rear end of which is hinged or jointed to the rear part of said center beam, and the front end of said pole extends forward a suitable distance.

A pin, $h'$, may be passed through either pair of the upper holes in the loop-standard and through the pole B, in order to elevate said pole more or less above the center beam.

The implement is provided with suitable handles, braces, double-tree, and single-trees, as shown in the drawing, and which need not be particularly described.

When in use the wheels A A straddle the furrow, and the wings C' are at equal distances each side thereof, and scrape the earth toward the furrow to cover it.

In covering corn, when the ground is light and well broken the loop-standard is adjusted so that when the implement is at rest the wheels will touch the ground. The wings will then scrape evenly over the surface, and gather earth sufficient to properly cover; but should the ground not be loose and friable, the wheels should be adjusted upward, so that when the team pulls the implement will tilt slightly forward until the wheels touch the ground, and the front ends of the wings C' will then perform a digging function, loosening up sufficient earth for the rear portions of said wings to scrape toward the furrow.

By adjusting the wheels downward low enough to raise the front ends of the wings from the ground, the said wings will, of course, scrape only a small portion of earth to the furrow and cover lightly.

In covering potatoes in heavy ground it will sometimes be necessary to elevate the pole some distance above the beam, in order that the team may exert a downward pull upon the front of the implement to give proper effect to the digging action of the wings.

The pole and center beam may be adjusted together or independently, as will be readily seen, and the proper relation to give them will be suggested by the nature of the ground.

What we claim as our invention is—

In a corn and potato coverer, the combination, with the fixed center beam F and the adjustable beams and scrapers C C', of the wheels A and axle $a$, the loop-standard G, rigidly attached to the said axle, and the hinged pole B, the said pole and beam F adjustable in said loop-standard G, substantially as shown and described.

WILLIAM HERBERT.
CORNELIOUS THOS. HERBERT.

Witnesses:
JOHN T. McCARTHY,
JOHN REARDON.